(12) United States Patent
Vouillamoz

(10) Patent No.: US 10,330,233 B2
(45) Date of Patent: Jun. 25, 2019

(54) CAPILLARY FLOW CONTROL SYSTEM FOR FLUID INDICATOR

(71) Applicant: Preciflex SA, Biel/Bienne (CH)

(72) Inventor: Lucien Vouillamoz, Feusisberg (CH)

(73) Assignee: PRECIFLEX SA, Neuchâtel (CH)

( * ) Notice: Subject to any disclaimer, the term of this patent is extended or adjusted under 35 U.S.C. 154(b) by 318 days.

(21) Appl. No.: 14/362,919

(22) PCT Filed: Dec. 5, 2012

(86) PCT No.: PCT/IB2012/002591
§ 371 (c)(1),
(2) Date: Jun. 5, 2014

(87) PCT Pub. No.: WO2013/084046
PCT Pub. Date: Jun. 13, 2013

(65) Prior Publication Data
US 2014/0326349 A1    Nov. 6, 2014

Related U.S. Application Data

(60) Provisional application No. 61/567,497, filed on Dec. 6, 2011.

(51) Int. Cl.
*F16L 55/027* (2006.01)
*G04B 19/00* (2006.01)
*G04B 25/00* (2006.01)

(52) U.S. Cl.
CPC ............ *F16L 55/027* (2013.01); *G04B 19/00* (2013.01); *G04B 25/00* (2013.01)

(58) Field of Classification Search
CPC ........ F16L 55/027; G04B 19/00; G04B 25/00
See application file for complete search history.

(56) References Cited

U.S. PATENT DOCUMENTS 4,229,975 A    10/1980  Rowe
6,360,794 B1 *  3/2002  Turner .................... B65B 3/003
                                                       141/1

(Continued)

FOREIGN PATENT DOCUMENTS

EP          0 112 302 A2   6/1984
JP          S6312929 A     1/1988
WO          WO 2011/021097 2/2011

OTHER PUBLICATIONS

International patent application No. PCT/IB2012/002591, International Search Report, dated Aug. 23, 2013.

(Continued)

*Primary Examiner* — Samuel P Siefke
(74) *Attorney, Agent, or Firm* — Da Vinci Partners LLC; John Moetteli

(57) ABSTRACT

A capillary system for a fluid indicator includes a fluid restrictor, and a capillary tube. The fluid restrictor has a small aperture formed therethrough. The capillary tube is adapted to receive a fluid. The fluid restrictor is sealingly affixed into at least one end of the capillary tube so that the small aperture communicates between the inside of the capillary tube and the outside of the capillary tube. The capillary tube is optionally treated so that an inner surface is oilophobic and hydrophobic. The system better controls the interface or meniscus 14 between the fluids contained in the capillary tube, preventing mixing.

18 Claims, 5 Drawing Sheets

(56) References Cited

U.S. PATENT DOCUMENTS

2007/0065945 A1* 3/2007 Sigrist ............... G01N 35/1011
436/43
2011/0020919 A1* 1/2011 Fulton .................. B01L 3/0275
435/287.2

OTHER PUBLICATIONS

International Search Report, International patent application No. PCT/IB2015/000446, dated Nov. 13, 2015.

* cited by examiner

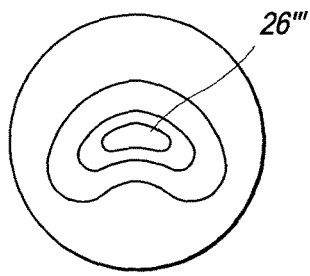
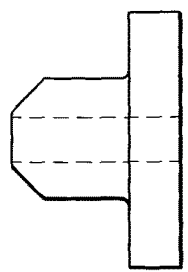
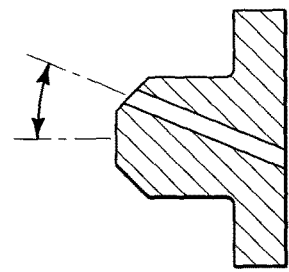
FIG. 4A  FIG. 4B  FIG. 5
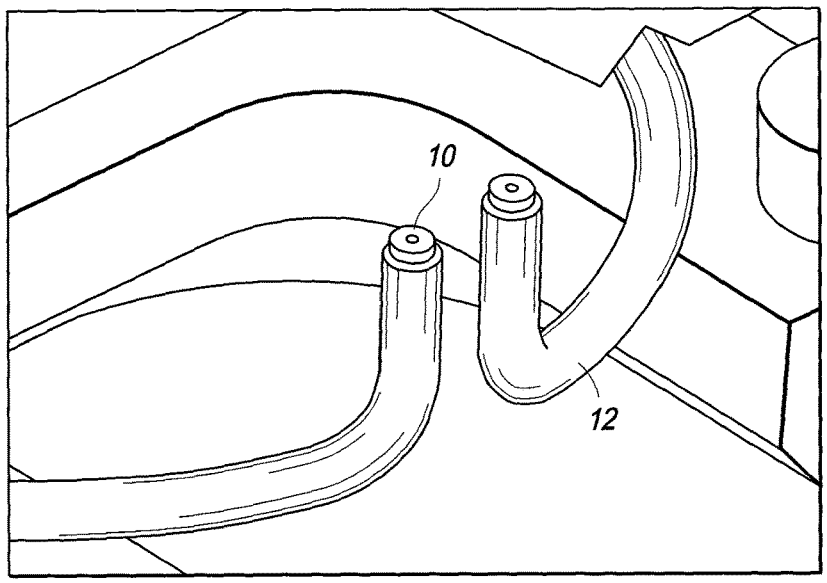
FIG. 6
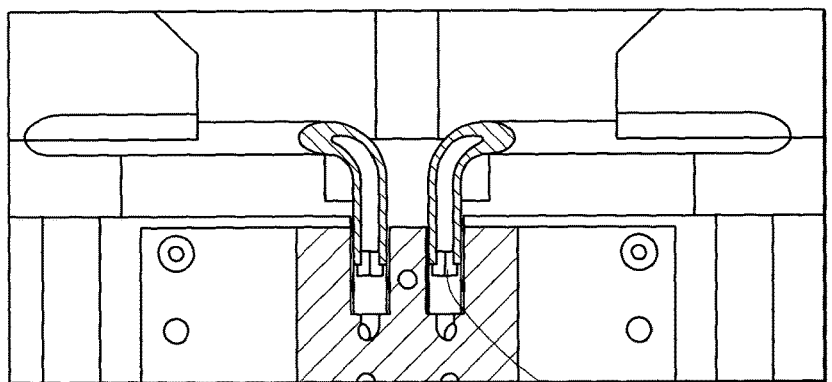
FIG. 7

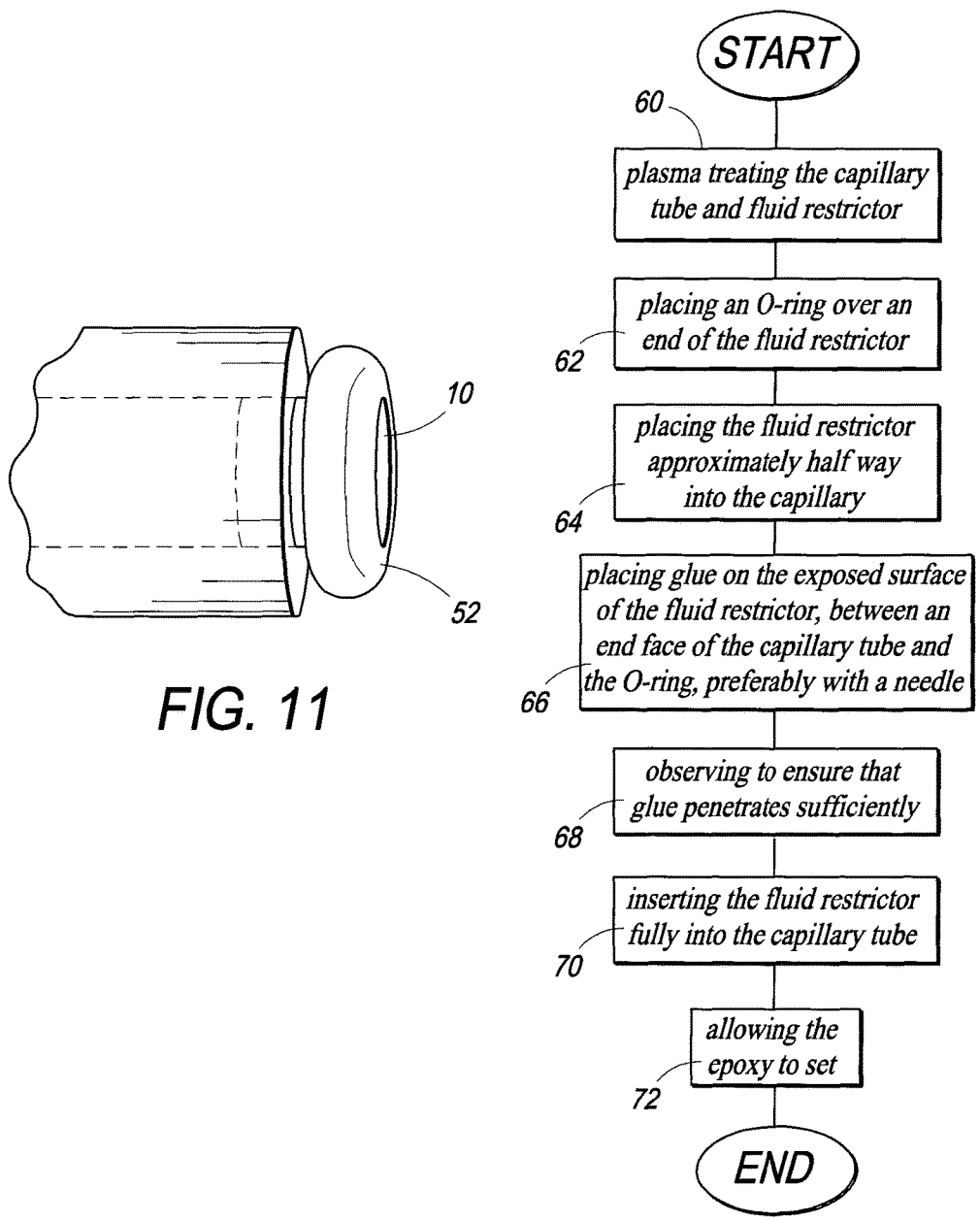

CAPILLARY FLOW CONTROL SYSTEM FOR FLUID INDICATOR

CROSS REFERENCE TO RELATED APPLICATIONS

This application claims the benefit of U.S. Provisional Application No. 61/567,497, filed Dec. 6, 2011, the content of which is incorporated herein by reference thereto.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein are to be construed as an admission that the present invention is not entitled to antedate such material by virtue of prior invention.

BACKGROUND OF THE INVENTION

This invention relates to hydraulic fluid systems, and in particular, hydraulic systems used in consumer products in which at least two fluids occupy a single container, and the level of the interface between the fluids is to be adjusted.

What is needed is a means of limiting fluid flow or restricting it to a controlled flow so that the fluids do not mix when a meniscus between the fluids is moved.

SUMMARY OF THE INVENTION

A capillary system is provided for a fluid indicator. The system includes at least one fluid restrictor, and a capillary channel or tube. The fluid restrictor has a small aperture formed therethrough. The capillary tube is adapted to receive at least two immiscible fluids. The fluid restrictor is sealingly affixed into at least one end of the capillary tube so that the small aperture communicates between the inside of the capillary tube and the outside of the capillary tube. The capillary tube is optionally treated so that an inner surface is oilophobic and hydrophobic. A fluid is pumped through the fluid restrictor into the capillary tube to move the meniscus formed between the fluids contained therein.

An object of the invention is better control of the interface or meniscus between the at least two fluids contained in the capillary tube, preventing mixing.

BRIEF DESCRIPTION OF THE DRAWINGS

FIG. 4A is a top view of a third alternate embodiment of the invention.

FIG. 4B is a side view of the third alternate embodiment of the invention.

FIG. 5 is a cross sectional side view of a fourth alternate embodiment of the invention.

FIG. 6 is a perspective view of ends of the capillary tube of the invention, with fluid restrictors installed in the ends thereof.

FIG. 7 is a partial cross sectional view of the ends of the capillary tubes in which the fluid restrictors are installed.

FIG. 11 is a perspective view of a fluid restrictor with an O-ring installed thereon, at an end of a capillary tube.

FIG. 12 is a flow chart of alternate method of making the invention.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as they are exemplary in nature, serving to describe the best mode of the invention known the inventors as of the filing date hereof. Consequently, changes may be made in the arrangement and/or function of any of the elements described in the exemplary embodiments disclosed herein without departing from the spirit and scope of the invention.

Figure 1A:
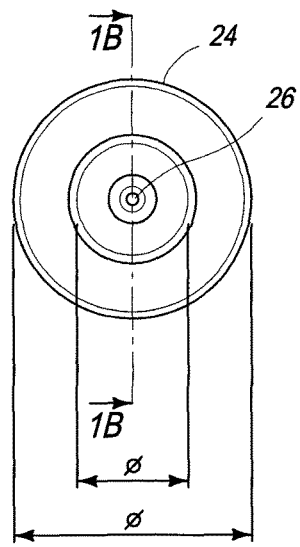
FIG. 1A is a top view of the fluid restrictor of the invention.
Figure 1B:
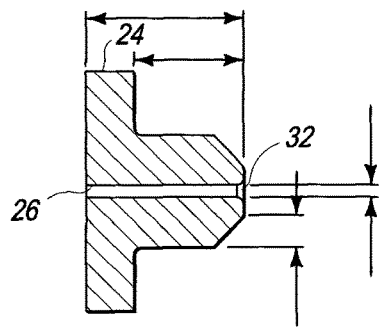
FIG. 1B is a cross-sectional side view of the fluid restrictor of the invention.
Figure 1C:
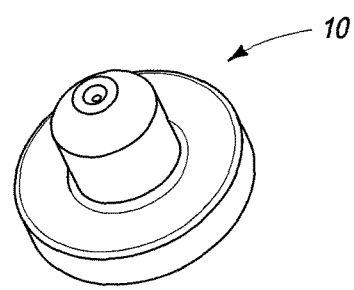
FIG. 1C is a perspective view of the fluid restrictor of the invention.
Figure 2A:
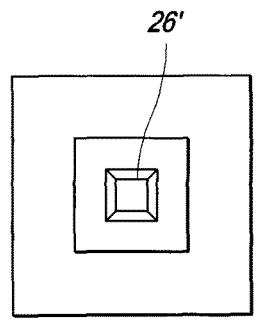
FIG. 2A is a top view of a first alternate embodiment of the invention.
Figure 2B:
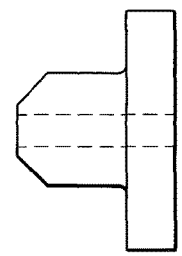
FIG. 2B is a side view of the first alternate embodiment of the invention.
Figure 3A:
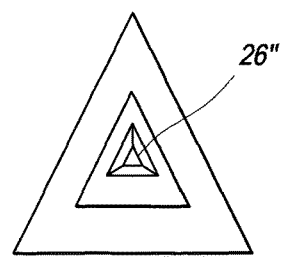
FIG. 3A is a top view of a second alternate embodiment of the invention.
Figure 3B:
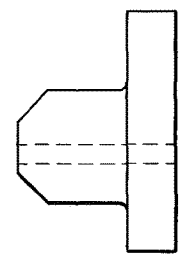
FIG. 3B is a side view of the second alternate embodiment of the invention.

Referring now to FIGS. 1A-1C, the fluid restrictors 10, combined with coating (surface treatment on the ID 11 of a capillary tube 12 which is too thin to be illustrated in the drawings) of the capillary tube 12 provide significant advantages when used in a watch such as that described in WO 2011/021097 A4 (the contents of which are incorporated herein by reference thereto). The restrictors 10 prevent excessively rapid movement of the meniscus 14 between the two fluids 12 and 20 within the tube, especially when setting the time, or during the return cycle at 6 in the morning or evening (i.e., a retrograde system). Indeed, without them, one of the two liquids 16 and 20, respectively, can disrupt the other, depending on the temperature, by creating a channel 22 in the other.

Note that in some embodiments, the capillary tube 12 is a capillary channel (102) (rectangular, triangular or irregular in cross section), formed in a plate (100), against which the dial (86) is sealingly affixed, such as shown in FIG. 7 of WO 2011/021097 A4, incorporated herein. Consequently, the term "tube" and "channel" are intended to mean one and the same thing when recited herein.

The coating improves the behavior of the meniscus 14 against the walls 11 of the capillary and together with an appropriate ratio of the apertures 26 and 34, helps prevent the disruption of the meniscus 14.

The fluid restrictor 10 is preferably a ceramic or stone but may also be a metal. The fluid restrictor 10 is formed as a cap-shaped element having a flange 24 formed thereon which prevents the fluid restrictor from entering the capillary tube 12 more than a prescribed amount. A tiny hole 26 (a few microns in diameter) in the fluid restrictor 10, glued on at least one end 30 of the capillary tube 12, is preferably located along the axis 32 of the fluid restrictor 10. The function of the fluid restrictor 10 is the stability of the meniscus 14, and the protection of the system.

The hole or aperture 26 in the fluid restrictor 10 has a width of between 0.03 and 0.1 mm in diameter. The aperture 34 of the capillary tube 12 has a width of between 0.6 and 1 mm, preferably 1 mm in diameter. Preferably, the ratio between the widths of the hole 26 of the fluid restrictor 10 and that of the capillary tube 12 is 1:5 to 1:15, for fluids having viscosities between 0.3 et 80 cP at room temperature, sea level, and preferably 0.3 à 5 cP.

Referring now to FIGS. 2A to 4B, the capillary tube 12 and the fluid restrictor 10 need not have circular inner apertures. In fact, such may be square, triangular, or irregular apertures 26', 26'', and 26''', respectively. These may also be adapted to such a non-circular channel (102) formed in the plate (100) shown in FIG. 7 of the PCT application incorporated herein by reference.

Referring now to FIG. 5, the hole or aperture 26 of the fluid restrictor 10 is formed such that the exit port of the aperture which exits into the capillary tube 12 enters the capillary tube at an angle to the central axis of the fluid restrictor 10. This reduces the chances that the incoming stream of fluid will disrupt the meniscus 14, particularly when the meniscus 14 is near the fluid restrictor 10, by diverting the flow away from the center of the meniscus 14 to the sides. Still further, several such holes connecting to a single central hole of the fluid restrictor 10 may further help diver the incoming fluid flow away from a center of the meniscus 14.

Referring now to FIGS. 6 and 7, fluid restrictors 10 of the invention, are shown installed in the ends 30 of a single capillary tube 12 (the tube is curved back on itself) with functionality as described in WO 2011/021097 A4 mentioned above. Referring in particular to FIG. 7, ends 30 of the fluid restrictors 10 and capillary tube 12 are shown in cross section, for clarity.

Figure 8:
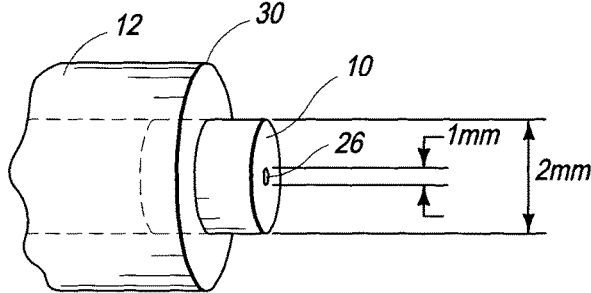
FIG. 8 is a perspective view of a fluid restrictor installed half way into an end of a capillary tube.

Referring now to FIG. 8, a fluid restrictor 10 is installed half way into an end 30 of a capillary tube 12, ready to receive a dose of a suitable epoxy.

Gluing Tests—Fluid Restrictor to Capillary

Any number of glues may be used to affix the fluid restrictor 10 to the capillary tube 12. Two have proven to be particularly effective. "VITRALIT"® 1605 from Panacol AG of Steinbach, Germany, diluted with a thinner, is one and has the following characteristics: "VITRALIT"® is thermally cured (30 min @ 105° C.) and/or UV cured (60 s @ UV-A 60 mW/cm2, thickness step: 0.5 mm). Further, it is a one component epoxy and has a viscosity in the range of 300-500 cPs (@25° C.).

As for "EPO-TEK"® 301, available from Epoxy Technology, Inc of Billerica, Mass. is thermally cured (1 hr @ 65° C.), is two component (20:5), and has a viscosity in the range of 100-200 cPs (@23° C.), which is significantly lower than "VITRALIT"®.

Figure 9:
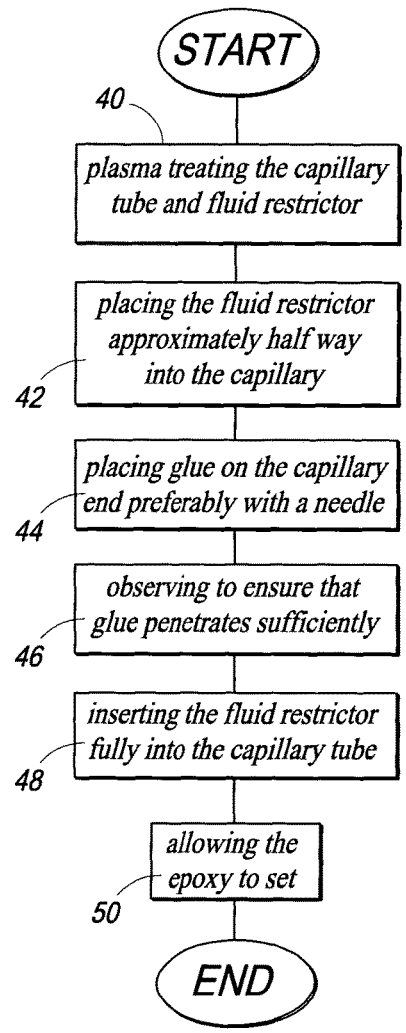
FIG. 9 is a flow chart of the method of making the invention.

Referring now to FIG. 9, the gluing procedure involves the following steps: In a first step 40, plasma cleaning of both capillary and fluid restrictor is performed. In a second step 42, the fluid restrictor is placed half-way into the capillary tube 12. In a third step 44, a drop of glue is placed on the end 30 of the capillary tube 12 with a standard disposable needle In a fourth step 46, observing to ensure that the epoxy is properly distributed around fluid restrictor 10. In a fifth step 48, the epoxy is allowed to penetrate around the fluid restrictor and into the capillary via capillary action. In a fifth step 50, the epoxy is allowed to dry or set.

Note that it has been found that "VITRALIT"® 1605 alone is too viscous to promote capillary action between capillary tube 12 and the fluid restrictor 10. To be suitable, it should be thinned with an appropriate thinner, whereas "EPO-TEK"® 301 is suitable without thinning.

Figure 10:
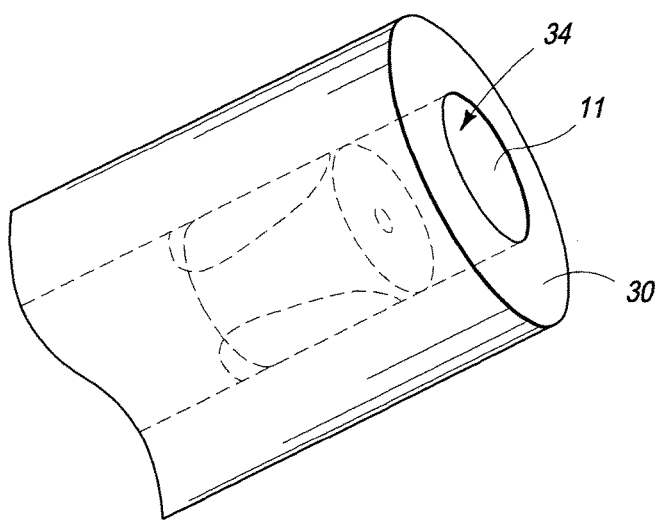
FIG. 10 is a perspective view of a fluid restrictor installed into an end of a capillary tube, in which there is an inadequate seal.

Referring now to FIG. 10, it has been observed that when the glue does not completely surround the fluid restrictor, unacceptable leakage may result.

Again, Vitralit® 1605 is too viscous for capillary action between the capillary tube 12 and the fluid restrictor 10. "EPO-TEK"® 301 is suitable as is. Deposition is critical. If the glue does not surround the fluid restrictor 12, it is not possible to add glue later, or to add glue via the capillary tube 12. Note that these tests were performed with capillary tube 12 having an OD of Ø2 mm and an ID of Ø1 mm.

As for alternative gluing procedures, inserting a small O-ring 52 around the fluid restrictor 12 helps ensure that the aperture 26 in the fluid restrictor 10 is not blocked by the glue.

Referring now to FIGS. 11 and 12, the modified procedure for gluing using the O-Ring 52 includes the following steps. In a first step 60, both capillary and fluid restrictor 10 and the O-ring are plasma cleaned. In a second step 62, the O-ring 52 is placed over an end of the fluid restrictor 10. In a third step 64, the fluid restrictor 10 is placed half-way into the capillary tube 12 until the O-ring 52 is in contact with the end rim of the capillary tube. In a fourth step 66, a drop of glue is placed on the exposed circumference of the fluid restrictor 10 with a standard disposable needle or an oil dispenser. In a fifth step 68, the glue is observed to ensure that it penetrates sufficiently. In a sixth step 70, the fluid restrictor 10 is fully inserted into the capillary tube 12 and the O-ring 52 is removed. In a seventh step 72, the epoxy is allowed to dry or cure. O-ring 52 prevents the hole 26 of the fluid restrictor 10 from being clogged by the glue.

Figure 13:
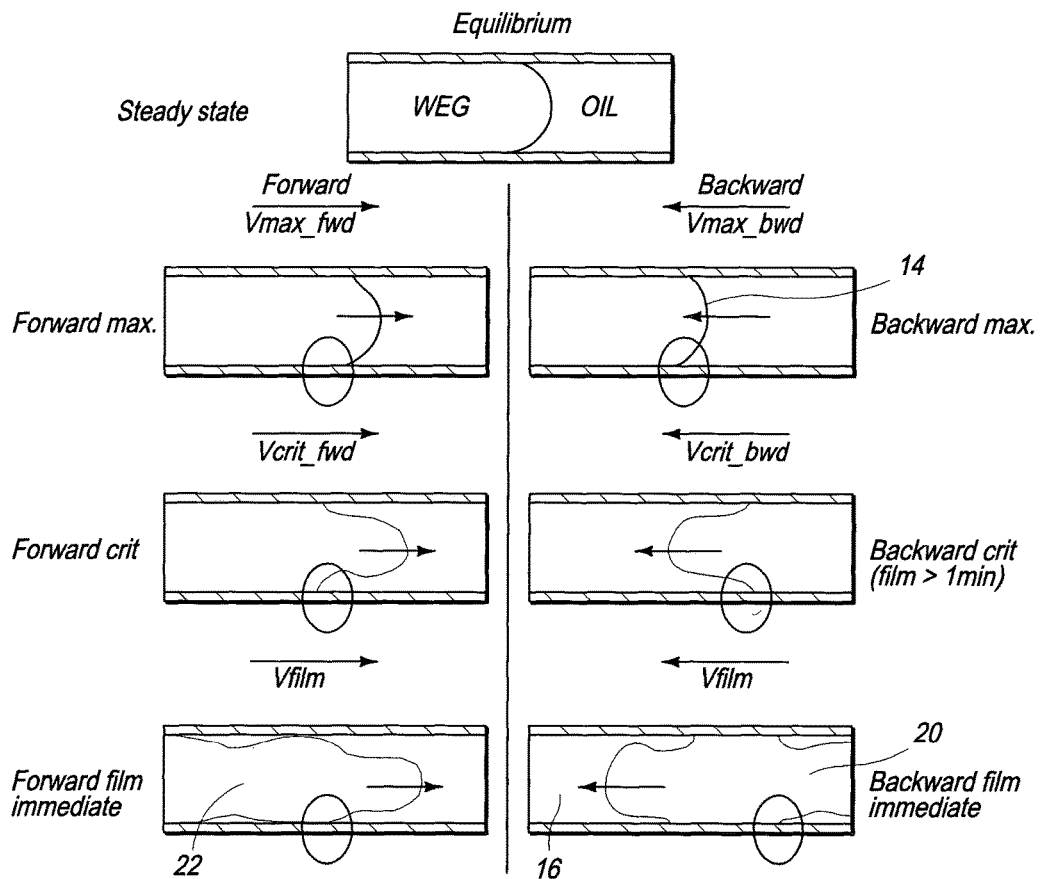
FIG. 13 is a table of representative menisci created depending on the speed and viscosity of fluid flow.

Note as well, that in addition to the fluid restrictor 10, a coating of the inside surface 11 of the capillary tube 12 is important to reliable and repeatable control of the meniscus 14 between the fluids in the capillary tube. The fluid restrictors 10 prevent a too rapid movement of the meniscus 14, especially, when the system is used in a watch such as that described in the above identified PCT application, in setting the time, or return at 6 in the morning or evening (retrograde system). Indeed, without these features, the risk is that one of the fluids can create, depending on the temperature, a channel in the other (see FIG. 13 below).

The coating allows it to improve the behavior of the meniscus 14 against the walls 11 of the capillary tube 12.

It should be appreciated that the particular implementations shown and herein described are representative of the invention and its best mode and are not intended to limit the scope of the present invention in any way.

As will be appreciated by skilled artisans, the present invention may be embodied as a system, a device, or a method.

Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

What is claimed is:

1. A capillary system for a fluid indicator includes:
   a) at least one fluid restrictor having a small aperture having a characteristic internal aperture formed completely through the restrictor, the restrictor connecting two fluid regions having an internal aperture width much larger to a certain ratio than the characteristic width of the characteristic internal aperture of the fluid restrictor; and
   b) a capillary tube being at least one of the two fluid regions, the capillary tube adapted to receive at least two immiscible fluids, and into at least one end of which the fluid restrictor is sealingly affixed so that the small aperture communicates between the capillary tube and the other of the two fluid regions, wherein further, the small aperture of the fluid restrictor has a width of between 0.03 and 0.1 mm.

2. The capillary system of claim 1, wherein the capillary tube is treated so that an inner surface is oilophobic and hydrophobic.

3. The system of claim 1, wherein the larger aperture of the capillary tube has a width of between 0.6 and 1 mm.

4. The system of claim 1, wherein the certain ratio is in the range of between 1:5 and 1:15.

5. The system of claim 1, wherein at least one of the apertures is round in cross section.

6. The system of claim 1, wherein at least one of the apertures is square in cross section.

7. The system of claim 1, wherein at least one of the apertures is triangular in cross section.

8. The system of claim 1, wherein at least one of the apertures is irregular in cross section.

9. The system of claim 1, wherein the aperture of the fluid restrictor is formed through a central axis of the cap.

10. The system of claim 1, wherein the aperture of the fluid restrictor is formed such that the exit port of the aperture in the fluid restrictor which exits into the capillary tube enters the capillary tube at an angle to the central axis of the cap.

11. The system of claim 1, wherein the fluid restrictor is made of ceramic.

12. The system of claim 1, wherein the fluid restrictor is made of stone.

13. The system of claim 1, wherein the fluid restrictor is made of metal.

14. The system of claim 1, wherein the fluid restrictor is glued to the capillary tube.

15. The system of claim 1, wherein the fluid restrictor and the capillary tube are adhered together using an epoxy.

16. The system of claim 15, wherein the epoxy is "VITRALI"® mixed with a thinner.

17. The system of claim 15, wherein the epoxy is "EPO-TEK"®.

18. The system of claim 1, used in an horological instrument to indicate time.

* * * * *